Patented Feb. 8, 1949

2,460,995

UNITED STATES PATENT OFFICE 2,460,995

POLYVINYL ALCOHOL PLASTICIZED WITH AN AMINE ADDUCT OF BUTADIENE CYCLIC SULFONE

Carl Walter Mortenson, Wilmington, Del., assignor to E. I. du Pont de Nemours & Company, Wilmington, Del., a corporation of Delaware No Drawing. Application December 22, 1944, Serial No. 569,429

6 Claims. (Cl. 260—30.2)

This invention relates to the preparation of polyvinyl alcohol plastics.

Polyvinyl alcohol products have been plasticized with agents such as glycerol and ethanol acetamide. These reagents, while satisfactory for certain applications, possess the disadvantage of volatility and are deficient in conferring good pliability at low temperatures and humidities. For example, films of polyvinyl alcohol plasticized with 20% of glycerol show poor low temperature toughness, the films cracking at +10° C. upon successive cooling and flexing. On long standing, these films become oily to the feel, due to the exudation of the plasticizer and the pliability, as measured by elongation and softness, decreases appreciably.

There is need, therefore, for new plasticizers for polyvinyl alcohol products, which plasticizers may be available for situations where the previously used plasticizing materials are of little or no utility.

This invention has, therefore, as an object the provision of new plasticizers for polyvinyl alcohol products. A further object is the preparation of shaped plasticized articles from polyvinyl alcohols.

These objects are accomplished by the following invention of polyvinyl alcohol articles containing as a plasticizer therefor an amine adduct of butadiene cyclic sulfone, preferably a lower (one to four carbon) amine adduct of butadiene cyclic sulfone.

Soft, pliable and homogeneous polyvinyl alcohol articles can be obtained by incorporating amine adducts of butadiene cyclic sulfone as plasticizers. The preferred method of carrying out this process consists in adding the desired sulfone adduct to appropriate solutions of the polyvinyl alcohol and casting the film by usual methods. Films obtained after evaporation of the volatile solvent possess good softness and good pliability at low temperatures and low humidities. The superiority of the sulfone adducts for promoting a high degree of plasticization of polyvinyl alcohol is best illustrated by the fact that the conventional agents used for this treatment, such as glycerol, give films which upon flexing crack at temperatures as high as +10° C. as compared to a corresponding cold crack of −35° C. for films plasticized with 3-(methylamino) thiolane-1,1-dioxide (the adduct of butadiene cyclic sulfone and methylamine). This superiority is again illustrated by the fact that films plasticized with the conventional agents lose their pliability upon aging at low humidities due to volatility and exudation of the plasticizer, whereas a polyvinyl alcohol film plasticized with an amine/sulfone adduct retains the plasticizer and shows much greater pliability.

The more detailed practice of the invention is illustrated by the following examples wherein parts given are by weight. There are, of course, many forms of the invention other than these specific embodiments.

Example I

Five parts of polyvinyl alcohol is dissolved in 45 parts of water and 1.25 parts of the methylamine adduct of butadiene cyclic sulfone [3-(methylamino)thiolane-1,1-dioxide] is added. The resultant mixture is stirred at room temperature for about ten minutes or until solution is effected. The clear, bubble-free solution obtained is then cast as a clear film on a glass plate or other suitable casting surface. The film obtained after evaporation of the solvent at room temperature may be dried further by heating in an oven, but generally such treatment is unessential. The film is clear, possesses a very good hand and softness and is quite pliable. After aging at 30% R. H. (relative humidity) and 25° C. for one month, it possesses an elongation of 235%. The film remains flexible at low temperatures as shown by the fact that it does not become stiff and brittle until cooled to −35° C., at which temperature cracking will occur on sharp bending. Under similar conditions, a film containing glycerol loses weight on aging due to loss of plasticizer by migration and volatility and cracks at +10° C.

Example II

To 50 parts of a 10% aqueous solution of polyvinyl alcohol is added 1.25 parts of the ethanolvinyl amine adduct of butadiene cyclic sulfone, presumably a mixture of 3-(2-hydroxyethylamino)-thiolane-1,1-dioxide and 3-(2-aminoethoxy)thiolane-1,1-dioxide. The resultant mixture has a pH of 9.1. The solution is allowed to stand at room temperature until free of bubbles and then is cast in the form of a thin film, which, after drying, is readily stripped from the casting plate. The resultant film has a good hand, is transparent, and is pliable even after aging for one month at 30° C. (30% R. H.) showing an elongation of 120%. The film is similar in most respects to that obtained in Example I above.

Polyvinyl alcohol articles may also be plasticized with the methanol adduct of butadiene cyclic sulfone as disclosed in Examples 3 and 4 below. It is noteworthy that the adducts of water, ethanol, and octanol with butadiene cyclic sulfone are not particularly effective as plasticizers for polyvinyl alcohol articles.

Example III

A mixture comprising 45 parts of water and five parts of polyvinyl alcohol is stirred after the addition of 1.25 parts of 3-methoxythiolane-1,1-dioxide (the methanol adduct of butadiene cyclic sulfone) until solution is effected. Films cast from this solution possess good hand at low humidities, and the elongation was 310% at 35% R. H. and 25° C. as compared to an elongation of 340% for a corresponding film plasticized with glycerol and conditioned similarly.

Example IV

Fifty parts of a 10% aqueous solution of polyvinyl alcohol is heated to 50–60° C. with stirring. Then 1.25 parts of 3-methoxythiolane-1,1-dioxide is added followed by the addition of 0.5 part of 2,3-dichlorodioxane and six parts of pyridine. The resultant mixture has a pH of 6.05. A film cast in the usual manner has a tensile strength of 6800 pounds per square inch at 92% break elongation. It has good low temperature toughness, cracking at −25° C. After conditioning for four days at 35% R. H. and 25° C. it had an elongation of 60%. The film possesses good water resistance as shown by 0% swelling after soaking the film for 30 minutes and by a wet tensile strength of 1200 pounds per square inch determined on a film immersed in water for five minutes and tested while wet. Plasticizer is lost, however, as shown by a 22% loss on weight after immersion in water for 30 minutes. A film cast without the sulfone had a tensile strength of 6800–9300 pounds per square inch (dry) and 1100–2800 pounds per square inch wet and an elongation at break of 0–10% (dry).

The reduction product of butadiene cyclic sulfone may be used as a plasticizer for polyvinyl alcohol as shown in Example V below. It may be noted that the reduction product of isoprene cyclic sulfone is not compatible with polyvinyl alcohol.

Example V

To a 10% aqueous solution of polyvinyl alcohol heated to 50–60° C. is added 3.3 parts of tetramethylene cyclic sulfone (thiolane-1,1-dioxide, the reduction product of butadiene cyclic sulfone), 0.5 part of 2,3-dichlorodioxane and four parts of pyridine. After stirring the heated mixture for 5–10 minutes, it is allowed to stand until cooled to room temperature and until it is bubble-free. The pH of the mixture is 5.92. A film is cast on a glass surface and is insolubilized by baking the film for about one hour at 100° C. The water-insoluble film loses 15.8% of its weight after immersion in water for 30 minutes as compared to a 35% weight loss for a film prepared in similar manner but plasticized with glycerol.

The above examples have employed polyvinyl alcohol, i. e., an essentially completely hydrolyzed polyvinyl ester. This is ordinarily obtained by the hydrolysis of polyvinyl acetate by well-known methods. Partially (e. g., 75–78%) hydrolyzed polyvinyl acetate may be plasticized with butadiene cyclic sulfone itself, as shown in Example VI below, although the sulfone is not particularly effective with polyvinyl alcohol itself.

Example VI

To fifty parts of an alcohol/water solution of a partially (75–78%) hydrolyzed polyvinyl alcohol is blended 1.25 parts of butadiene cyclic sulfone (thiophene-1,1-dioxide). The bubble-free solution is cast on a metal surface to give a well plasticized (compatible) film.

Partially hydrolyzed polyvinyl acetate may also be plasticized with the reduction product of butadiene cyclic sulfone as shown in Example VII below.

Example VII

A film of a partially (75–78%) hydrolyzed polyvinyl alcohol is prepared by casting on a glass surface a solution containing five parts of the polymeric alcohol and 1.25 parts of thiolane-1,1-dioxide (reduced butadiene cyclic sulfone). It is allowed to stand at room temperature until dry. The film is slightly tacky and rubbery. It is homogeneous and the cyclic sulfone appears to be a good plasticizer. Similar films are obtained when the plasticizer is used in larger amounts. This reagent is also compatible with, and a fair plasticizer for completely hydrolyzed polyvinyl alcohol.

The invention has been illustrated above with the adducts of butadiene cyclic sulfone with methylamine and ethanolamine. The invention is, however, believed to be applicable to adducts of butadiene cyclic sulfone with other amines and preferably with amines of one to four carbon atoms, including ethylamine, ethylenediamine, butylamine, etc.

It is possible and in some cases even desirable to use mixtures of the amine/sulfone adducts with a different type of softener such as glycerol or ethylene glycol or ethanolacetamide. As an example of these softening compositions there may be employed a mixture of 3-(methylamino)-thiolane-1,1-dioxide with ethanolacetamide.

Since water is the most practical solvent for polyvinyl alcohol itself, aqueous media are preferred in the practice of this invention. However, it will be understood that this invention is not limited to any particular process of plasticizing polyvinyl alcohol with the sulfone adducts. Thus, media other than water, such as dioxane, chloroform, hydrocarbons, halogenated hydrocarbons, alcohols or mixtures of these may be employed. The plasticizing agents may be added to solutions as one means of accomplishing softening. However, other ways commonly known in the art may be employed, including the passage of the sheet or film of the polyvinyl alcohol through a bath containing a suitable sulfone. In this procedure, the time of immersion may be varied from a few seconds to an hour or more, depending upon the rapidity with which the particular amine/sulfone adduct is impregnated into the polyvinyl alcohol. Again the temperature of the bath may be maintained at room temperature or at elevated temperatures as desired. It is also possible to bring about plasticization in the total absence of solvent. For example, certain polyvinyl alcohols may be blended with the amine/sulfone adduct on a rubber mill, and sheeted or molded articles may be prepared from such blends, producing products which are softened to an extent depending upon the amount of plasticizer employed.

Ordinarily, 5–20% concentrations of the softener are preferred. However, in applications requiring extremely high pliability, higher concentrations may be used. Thus, compositions containing 30–50% (based on the total weight) of softening agent may be prepared. In general, however, these films containing high amounts of plasticizer are limp and frequently tacky.

Sulfone adducts may be prepared as disclosed in U. S. P. 2,291,798 and 2,219,006, British 489,974 and German 682,079. The sulfones may be prepared as in German 506,839.

Polyvinyl alcohol of any conventional viscosity may be employed in this invention. These types of polyvinyl alcohols may be employed in either aqueous or organic media.

Certain sulfone adducts may, in some cases, be used successfully as plasticizers for other types of polyvinyl alcohols, not necessarily water-soluble, including hydrolyzed interpolymers of ethylene and vinyl acetate, hydrolyzed methyl methacrylate/vinyl acetate interpolymers, hydrolyzed vinyl acetate/vinyl chloride interpolymers, hydrolyzed vinyl acetate/styrene interpolymers, hydrolyzed vinyl acetate/acrylonitrile interpolymers, hydrolyzed vinyl acetate/vinylidene chloride interpolymers; derivatives of polyvinyl alcohol, e. g., polyvinyl alcohol reaction products with formaldehyde, acetaldehyde, butyraldehyde or ketones such as cyclohexanone, methyl cyclohexanone or 1-keto-tetrahydronaphthalene.

While the examples given have illustrated only formation of films, the compositions may be converted into threads or other shaped articles or may be molded, and any method well known in the art for the preparation of these articles may be used. Thus, the compositions can be cast or spun into an atmosphere designed to evaporate the solvent rapidly, or they may be cast into a suitable coagulating bath such as that disclosed in Izard and Kohn U. S. P. 2,236,061, employing in either method a continuous or discontinuous operation. In forming films, the compositions may be cast on a heated casting surface, such as a metal wheel or a continuous belt, removing the film after the solvent or dispersing medium is evaporated. Alternatively, the films may be formed by casting the compositions on a glass plate, allowing the solvent to evaporate. The films may be extruded from solutions into suitable coagulating baths which are selected so as not to dissolve the sulfone. It is frequently desirable to insolubilize the polyvinyl alcohols in order to decrease water sensitivity. The insolubilizing agents which may be used for these purposes include dimethylolurea, trimethylolmelamine, 2,3-dichlorodioxane and halogenated polymeric ethers such as those disclosed in copending application Serial No. 507,479, filed October 23, 1943, now Patent Number 2,416,880.

Polyvinyl alcohol finds many outlets where a high degree of pliability is needed. Frequently, however, the articles are exposed to low temperatures and low humidities, and for this reason greater softening is desired in the final manufactured article. The outstanding advantage of the softening agents of this invention over those conventional agents used in these articles and described in the prior art is the pliability which they contribute to polyvinyl alcohols at low temperatures and low humidities. The products produced according to this invention are transparent and pliable at low temperatures and low humidities. They may be used in the manufacture of improved coated fabrics, impregnated paper or other cellulosic materials, unsupported films, or many other articles of manufacture.

The above description and examples are intended to be illustrative only. Any modification thereof or variation therefrom which conforms to the spirit of the invention is intended to be included within the scope of the claims.

What is claimed is:

1. A polyvinyl alcohol article containing as a plasticizer therefor an amine adduct of butadiene cyclic sulfone.
2. A polyvinyl alcohol article containing as a plasticizer therefor an adduct of butadiene cyclic sulfone with an alkylamine.
3. A polyvinyl alcohol article containing as a plasticizer therefor an adduct of butadiene cyclic sulfone with a lower alkylamine.
4. A polyvinyl alcohol article containing as a plasticizer therefor the adduct of butadiene cyclic sulfone with methylamine.
5. A polyvinyl alcohol film having as a plasticizer therefor the methylamine adduct of butadiene cyclic sulfone.
6. A polyvinyl alcohol article containing as a plasticizer therefor the adduct of butadiene cyclic sulfone with ethanolamine.

CARL WALTER MORTENSON.

REFERENCES CITED

The following references are of record in the file of this patent:

UNITED STATES PATENTS

| Number | Name | Date |
|---|---|---|
| 2,271,468 | Watkins | Jan. 27, 1942 |

FOREIGN PATENTS

| Number | Country | Date |
|---|---|---|
| 489,974 | Great Britain | Aug. 8, 1938 |